United States Patent [19]

Malchman et al.

[11] 3,872,252

[45] Mar. 18, 1975

[54] APPARATUS FOR MONITORING ELECTRICAL SIGNALS, EITHER ARTIFICIAL AND/OR NATURAL IN A LIVING BODY, VIA A COMMUNICATION LINK

[75] Inventors: Franklin Leonard Malchman, King of Prussia; Robert William Johnson, Levittown; William J. Raddi, Philadelphia, all of Pa.

[73] Assignee: ESB Incorporated, Philadelphia, Pa.

[22] Filed: Mar. 7, 1973

[21] Appl. No.: 337,261

[52] U.S. Cl. ........... 197/2 A, 128/206 R, 128/2.1 A

[51] Int. Cl. .......... H04m 11/00

[58] Field of Search ....... 128/2.1 A, 2.06 B, 2.06 R, 128/2.06 F, 419 P; 179/2 A, 2 DP, 15 BM

[56] References Cited

UNITED STATES PATENTS

| | | | |
|---|---|---|---|
| 3,120,227 | 2/1964 | Hunter | 128/2.06 R |
| 3,426,150 | 2/1969 | Tygart | 179/2 A |
| 3,426,151 | 2/1969 | Tygart | 179/2 A |
| 3,626,417 | 12/1971 | Gilbert | 179/15 BM X |
| 3,646,930 | 3/1972 | Patterson | 128/2.06 F |
| 3,742,938 | 7/1973 | Stern | 128/419 P X |

OTHER PUBLICATIONS

Bell Laboratories Record, "Electrocardiograms by Telephones," Feb. 1966 issue, pp. 43–47.

*Primary Examiner*—David L. Stewart

[57] ABSTRACT

A monitor apparatus for simultaneously monitoring via a telephone communication link electrocardiographic signals of a patient produced as a result of the heart function of the patient, and electrical artifact signals produced as a result of the electrical output of a heart pacer artificially stimulating the heart of the patient. The monitor apparatus includes a transducer adapted to sense both the electrocardiographic signals and the electrical artifact signals of a patient and to process the sensed signals to transmittable signals for transmission over the telephone communication link. The monitor apparatus also includes a receiver adapted to receive the signals transmitted over the telephone communication link and to process the received signals for providing a visual display to an observer of information indicative of the repetition rate of the electrical artifact signals and a recorded readout indicative of the electrocardiographic signals along with the artifact signals and the time occurrence relationship of the artifact signals with respect to the electrocardiographic signals.

16 Claims, 7 Drawing Figures

APPARATUS FOR MONITORING ELECTRICAL SIGNALS, EITHER ARTIFICIAL AND/OR NATURAL IN A LIVING BODY, VIA A COMMUNICATION LINK

BACKGROUND OF THE INVENTION

1. Field of the Invention

This invention generally relates to apparatus for monitoring electrical signals, either artificial and/or natural in a living body, via a communication link. The invention will here be described in most detail in association with a battery powered electronic cardiac stimulator or "heart pacer" since the apparatus according to the invention has been particularly developed for use with a heart pacer. The apparatus, however, may be used in conjunction with other battery powered organ stimulators. It, may for example, be used in conjunction with stimulators for the brain, bladder and other organs as well.

A first aspect of the invention relates to apparatus for monitoring from outside a living body, and preferably from a remote location, a totally implanted heart pacer. More particularly, the first aspect of the invention concerns monitor apparatus which can be used to provide information or indicate to an observer, and/or record the state of condition of the power supply, generally comprising a battery, supplying electrical energy to the heart pacer; such information or indication being derived from the rate of operation of the heart pacer. A second aspect of the invention relates to monitor apparatus capable of transmitting, from a remote location to a receiving location, an electrocardiogram (ECG).

2. Description of the Prior Art

By way of background, it may be explained that electronic heart pacers are used in the treatment of heart block. Simply stated, heart block occurs when the natural periodic electric stimulation signals generated on a portion of the hart, the atrium, are for some reason partially or wholly blocked or prevented from reaching another portion of the heart, the ventricle. Because of the blockage, the ventricle does not function properly, that is, it does not pump at the proper time or at the proper rate.

Essentially, an electronic heart pacer is a device used to overcome or treat heart block. In recent times, the electronic heart pacers have been miniaturized and are now wholly implanted within the body, usually just below the level of the skin. Implanted pacers are usually self-contained and powered by battery. The pacers generate electric stimulation pulses which are then applied via a flexible lead or leads, to the heart. The generated electric pulses, i.e., artificial stimulation signals, when applied to the heart, supplant the natural periodic electric stimulation signals generated on the atrium and result in the ventricle pumping at the proper time and rate substantially as in normal situations. Generally, the heart is electrically stimulated to beat once for each pulse that is generated by the pacer and received at the heart.

There are three broad categories into which most commercial pacers fall, namely, the synchronous types, the asynchronous types and the inhibited or standby types. The synchronous types are also sometimes referred to as "triggered" pacers in that their operation is effected by a signal derived from body activity which is sensed and fed back to the pacer to trigger its operation; the derived trigger signal usually being the presence or absence of either atrial or ventricular activity. The asynchronous types are also sometimes referred to as "non-triggered" in that they do not respond in any way to body activity; they operate at a fixed rate. The inhibited or standby types under normal cardiac activity do not produce stimulation pulses, however, if spontaneous rhythm is not sensed within a predetermined time interval, as for example, one second, then the pacer delivers a stimulating pulse, and continues to deliver pulses until normal rhythm is restored.

Most triggered pacers and most inhibited or standby pacers contain a reed switch which can be externally activated by a magnet to convert the pacer to asynchronous or non-triggered operation.

As stated above, pacers are usually powered by batteries. The batteries best suited for powering pacers normally maintain a substantially constant voltage throughout their lives, and then, near the end of their lives run down over a relatively short period of time. Generally, toward the end of life of the batteries of an operating pacer, or one caused to operate in a non-triggered mode, the pulse rate thereof decreases (the output pulse interval increases) and consequently, the heart beats slower. There is a type of pacer, however, in which the pulse rate increases with a decrease in battery voltage. In addition to changes in pulse rate due to battery exhaustion, a pacer's pulse rate may change due to physiological conditions or due to malfunction of the pacer.

It is, of course, important that changes in the pulse rate of a pacer, after implant, be detected at the earliest possible time in order that the cardiologist treating the patient may take appropriate measures to safeguard the life of the patient, as for example, he may consider that replacement of the pacer is called for when the pulse rate of the pacer falls to some predetermined rate below the rate determined or set at the time of implantation of the now failing pacer.

From the foregoing, it will be understood that an indication of the condition or state of the power supply or battery of a pacer operating, or caused to operate, in a non-triggered mode may be had by determining the time interval between two successive pulses of the pacer. Consequently, it has become desirable to provide an apparatus that would monitor the pulse rate of a pacer and, as the pulse interval of the pacer changes, due to a defective battery, or the critical period of rapid decline in battery voltage near the end of its life, or for any other reason, to give an indication of such a change in pulse interval. Such an apparatus would provide the cardiologist with an effective means to monitor and ascertain the performance or condition of the battery or batteries of the pacer. Even more desirable would be apparatus that can be adapted to perform such functions from outside the body and from a remote location in order that it not be required that the patient make frequent trips to the office of the cardiologist.

Such an apparatus has in fact been recently developed. See the Abstract entitled Transtelephone Pacemaker Clinic by S. Furman, B. Parker and D. Escher, published in the *American Journal of Cardiology*, Volume 25, Page 94. The abstract cited does not go into details of the apparatus used for the monitoring of a patient's implanted heart pacer via telephone lines, however, the apparatus used is known to the present inventors and comprises a transducer situated with the patient, usually in his home, and a receiver coupled to an electronic interval counter located at some central office, lab or hospital. Each pacer output pulse or pacer artifact signal is detected or sensed by the transducer at the patient's hands and converted to an audible signal which is acoustically coupled to the patient's telephone handset for transmission to another telephone handset at the receiver location. The received audible signals are converted to short electrical pulses by the receiver and the receiver delivers these electrical output pulses to the electronic counter. The counter is adapted to provide a display of the time interval, in milliseconds, between received signals. The time interval between received signals provides an indication to an observer or personnel at the receiver location of the voltage state of the batteries of the pacer being monitored. More particularly, the time between received signals is compared to previously received or recorded data compiled over a period of time and the degree of change is then used as an indication of the state of the batteries of the pacer. The received data may, of course, be used for other diagnostic purposes.

U.S. Application Ser. No. 118,144, filed Feb. 23, 1971 now U.S. Pat. No. 3,769,965, issued Nov. 6, 1973, assigned to the same assignee as the instant application, is directed to apparatus similar to that described above and represents novel improvements thereto.

In the apparatus of these prior art disclosures, there is no provision for determining if, in fact, the heart is being stimulated even though a pacer artifact is correctly monitored or detected. The need for such a provision or feature is desirable because a pacer with a dislodged or broken catheter would not stimulate the heart but detection of the pacer artifact by the prior art apparatus could indicate to an observer heart stimulation and supposedly a properly functioning pacer. Consequently, it now has become desirable to provide monitor apparatus, not only with the features described in the above identified application and published Abstract, but also monitor apparatus capable of transmitting, from a remote location to a receiving station, an electrocardiogram.

Electrocardiograms provide the practical clinician with information concerning the electrical activity or heart function of the patient from which he can determine the condition of the heart of the patient. Previously, such electrocardiograms have been transmitted from the patient to the clinician via telephone, but due to technical limitations of the apparatus utilized, the pacer artifact, in cases of pacemaker patients, has not been clearly evident in the recorded results of the transmitted data, that is in the recorded electrocardiogram.

The present invention is directed to an apparatus, not only capable of transmitting and recording a conventional electrocardiogram but also capable of simultaneously transmitting and recording a representation of the pacer artifact along with the electrocardiogram. With a properly working pacer, the artifact representation in the recorded results of the apparatus of the invention is always seen to immediately precede in time the QRS complex of the electrocardiogram thereby proving stimulation of the heart by the pacer unless the heart is in normal sinus rhythm (not in heart block). In the case where the heart is in normal sinus rhythm, the pacer will cause competition between ventricular contractions resulting from normal spontaneous rhythm and those caused by the pacer stimulation signal. This latter situation will result in a recorded electrocardiogram which shows that some QRS complexes immediately succeed and have been caused by a pacer pulse and others have been caused by natural stimulation signals. However, even in this latter situation it is clear that the pacer is stimulating the heart and consequently is functioning properly.

SUMMARY OF THE INVENTION

Briefly, and in accordance with the invention, an apparatus is provided for simultaneously monitoring via a communication link electrical signals of a patient resulting from both natural and artificial stimulation of the heart of the patient such that the repetition rate of the artificial stimulation signals can be determined, and such that the electrocardiogram of the patient can be recorded. The monitor apparatus includes a transducer means adapted to sense both artificial and natural stimulation signals of a patient and to process the sensed electrical stimulation signals to transmittable signals for transmission over the communication link, and a receiver means adapted to receive the signals transmitted over the communication link and to process the received signals for providing to an observer information indicative of the repetition rate of the artificial stimulation signals and a readout indicative of the naturally occuring stimulation signals along with the time occurrence relationship of the artificial signals with respect to the naturally occuring stimulation signals.

DESCRIPTION OF THE PREFERRED EMBODIMENTS

Outline of Characteristics and Use

Figures 1, 2:
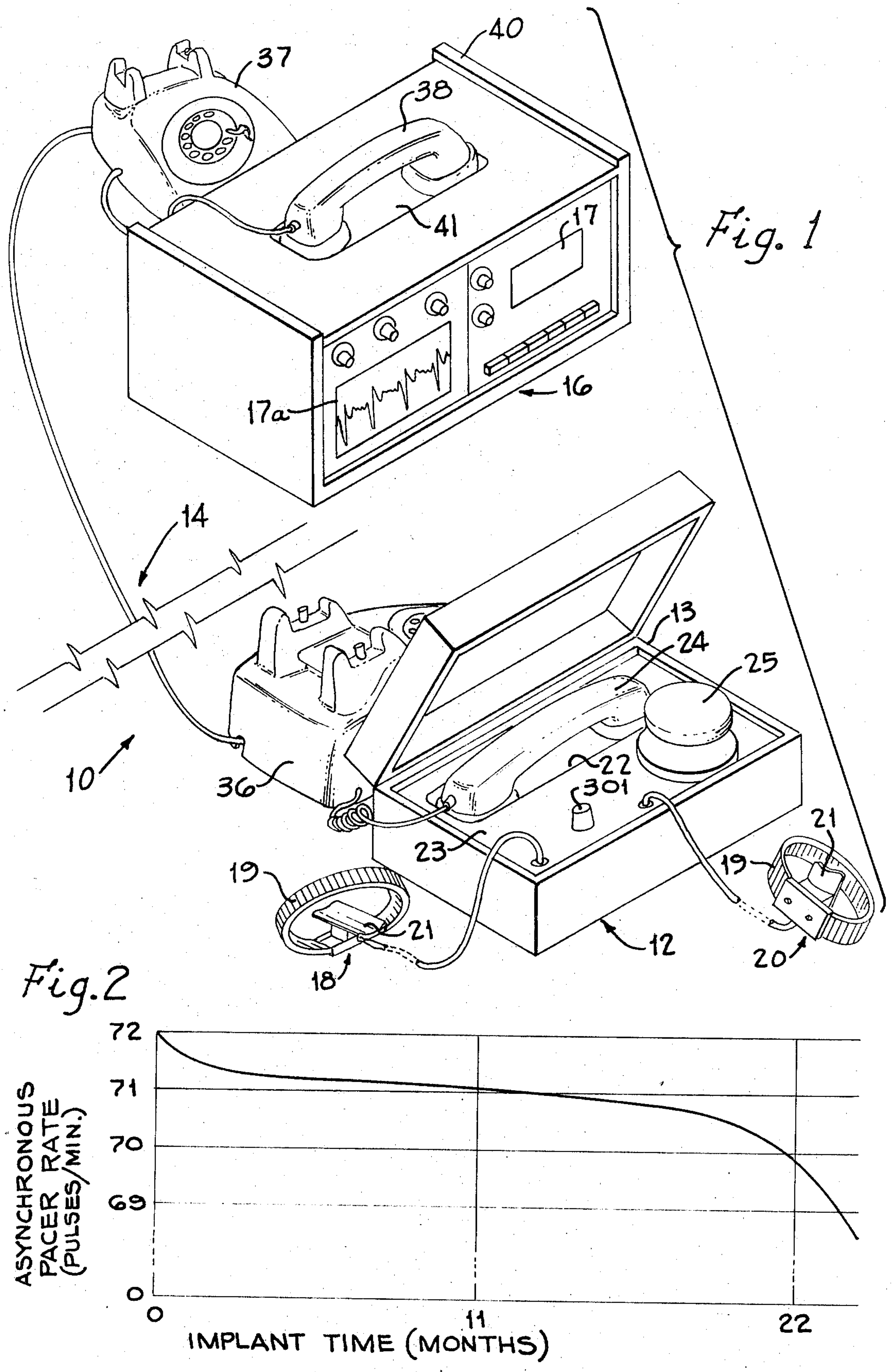
FIG. 1 is an over-all perspective view of the monitor apparatus in accordance with the invention.
FIG. 2 is a diagrammatic graph illustrating asynchronous pacer rate in pulses per minute against implant time in months.

In order to lay a foundation of the detailed description of the operation of the monitor apparatus of the invention which follows hereinafter, a brief outline of the characteristics and use of the monitor apparatus will first be given together with a partial description of the functions of certain of the components of the monitor apparatus. The functions of the various components not given in this brief outline will, however, become evident or appear in the detailed description of the operation of the monitor apparatus.

Also, it may be explained here, that the electrical output signals or stimulation pulses, that is, the pacer artifact signals, of an implanted cardiac pacer as well as the patient's electrocardiographic signals may be sensed by electrodes placed in contact with the body. The sensed pacer artifact signals will be coincident in time with the pacer pulses, the interval and pulse width or duration will be substantially the same. The level of the artifact signals, however, will be lower and they may vary in shape. The electrocardiographic signals will be representative of the electrical activity or heart function of the patient. Referring now to the drawings wherein like reference characters refer to like parts throughout, in FIG. 1, the monitor apparatus is designated generally by the reference number 10. Briefly, the monitor apparatus includes a transducer shown generally at 12 which is used to sense the electrical pulses generated by an implanted cardiac pacer (not shown), that is, the electrical artifact signals, and to sense the patient's electrocardiographic signals, and thereafter, convert these artifact signals and electrocardiographic signals to transmittable signals or information for transmission over a standard telephone communication network, shown generally at 14. A receiver, shown generally at 16, which would typically be located at a remote telephone station such as a cardiologist's office, receives the information, processes it and displays this processed information at 17 and 17*a*. The processed information that is displayed at 17 is the pacer rate in beats per minute or the time interval, in milliseconds, between received signals, which, of course, is an indication of the rate of the output pulses of the implanted pacer. At 17*a*, the receiver 16 is provided with a strip chart recorder to record the electrocardiogram of the patient as well as the time of occurrence relationship of the artifact signals with respect to the electrocardiographic signals as will be explained more fully hereinafter.

Accordingly, the complete monitor apparatus comprises the three sub-systems; the transducer 12; the telephone communication network 14 which forms no part per se of the invention; and the receiver 16.

The transducer 12 comprises a case or housing 13; sensing means, such as the two metallic electrodes shown generally at 18 and 20, in the form of stretch arm bands 19, similar to a watch band, having an electrode plate 21 joining the two ends of the bands which the patient wears on the forearms during use of the monitor apparatus; an electronic circuit, housed within case 13 to be described more fully below, which processes sensed signals; a cradle 22 formed in the surface 23 which accepts a standard telephone handset 24; an audio speaker (230, FIG. 3); a magnet 25; and a battery to power the electronic circuit; if desired, however, the transducer 12 may be supplied with conventional AC power. Other components of the transducer 12 will be more fully described hereinafter with reference to FIG. 3.

The two electrodes 18 and 20, hereinafter sometimes referred to as pick-up means, could take the form of two probes which the patient would grasp or place in contact with two points on the body of the patient during use of the monitor apparatus, or they could be standard electrodes used in ECG work, however, the electrodes 18 and 20 preferably take the form of arm bands as shown in FIG. 1. The reason for this preference is because the monitor apparatus 10 is also used to transmit ECG data. The current state of the art in the transmission of ECG data by telephone requires the patient to use ECG electrodes and electrode jelly or to grasp a pair of probes, one in each hand or one probe under each arm or at two other points in contact with the body. This is a difficult operating procedure for many geriatic patients. Also, requiring a patient to grasp hand probes with sufficient force to assure minimal electrical contact resistance would tend to induce muscle tension which in turn, would give rise to electrical signals within the body that would appear as unwanted noise signals in the recorded electrocardiogram and, thus, would interfere with the proper interpretation of the recorded ECG signal. In other words, to obtain a proper ECG, the patient should be completely muscularly relaxed. The preferred arm bands allow the patient to sit or lie relaxed without grasping anything while only an ECG is being recorded. Other advantages and features of the arm bands 18 and 20 are set forth in a co-pending U.S. Application Ser. No. 337,262, filed concurrently herewith, now U.S. Pat. No. 3,826,246 which is assigned to the same assignee as is the instant application.

When both an ECG signal and the pacer artifact signals are being monitored simultaneously, it is required that the patient place the magnet 25 over the site of an implanted pacer if the patient's pacer is a non-fixed rate pacer. The magnet 25 will activate the reed switch contained in most non-fixed rate pacers when the patient places the magnet 25 over the site of the implanted pacer. Placing the magnet over the site of such an implanted pacer will cause the pacer to revert to its non-triggered or fixed rate mode. As the magnet 25 must be just placed over and maintained in the desired location, the patient does not have to exert much grasping force and, due to the fact that the electrodes are placed above the wrists, muscle tension is minimized so as not to interfere with the recording of a proper ECG.

The communication network, as depicted in FIG. 1, comprises the telephones 36 and 37 with their respective handsets 24 and 38. The communication network while shown as the standard telephone network, may, of course, comprise any known communication link.

The receiver 16 comprises the housing 40 which is adapted to receive the handset 38 in a cradle 41 formed in the top surface of the housing 40; an electronic circuit which processes received information; display 17; and strip chart recorder 17*a*. The receiver 16, including its associated circuitry, will be described more fully hereinafter with reference to FIG. 4.

The use of the monitor apparatus shown in FIG. 1 is generally as follows: A telephone call is initiated by a clinician or operator to the patient. Upon answering the call, the patient is instructed to put the electrodes 18 and 20 on and place the telephone handset 24 into the cradle 22. If the patient has a triggered type or the inhibited or standby pacer, the patient is also instructed to place the magnet 25 over the site of the implanted pacer. As explained above, this action will cause the magnet 25 to activate the reed switch contained in the pacer and cause the pacer to revert to its fixed rate. When the patient places the handset 24 into the cradle 22, a power switch (not shown) is closed which activates the transducer 12. The operator places the handset 38 in the receiver cradle 41. Preferably, audible information signals, representing the pacer's fixed rate as well as information of the ECG signal of the patient, are then transmitted to the receiver 16 via the communication link 14. As will be explained hereafter the transmitted information need not be audible but may be electrical. The characteristics and the manner in which information is generated and received will be described more fully below. With the operator's handset 38 resting in the cradle 41, the transmitted information will be magnetically or acoustically coupled to the receiver 16 which processes the received information and displays the rate in beats per minute or time interval, in milliseconds, between successive pairs of pacer output signals. Typically, for pacers designated to deliver a fixed rate of 72 impulses per minute, the reading on the interval counter will be 833. Manually or electronically dividing this number into 60,000 or by the use of pre-printed tables, the operator can determine the output rate of the pacer in pulses per minute. It will be understood that, if desired, known circuitry is available to adapt the receiver 16 to provide a direct indication of the artifact rate in beats or pulses per minute. The operator records and compares the rate with previous data, informs the patient of the state of the pacer and arranges for the next telephone call to repeat the process. The received information is also simultaneously processed to drive the strip chart recorder **17*a* to provide a lead 1** ECG.

The above described monitoring process can be used to determine the state of the batteries of all implanted pacers that have a pulse rate that is variable as a function of battery voltage. The monitor apparatus is designed to provide an accurate and repeatable determination of interval resolved with an accuracy of ±1 millisecond (or rate resolved to an accuracy to the nearest ±0.1 pulses per minute). Such accuracy is desired because sudden real changes in rate by 1 to 2 pulses per minute are significant and can warn the cardiologist of impending pacer failure. By keeping accurate records of pacer rate and the rate of rate change, battery exhaustion can be detected when it begins or soon thereafter. It is important to determine the beginning of battery exhaustion as soon as possible for the reason that the rate change can be quite rapid with a change from a substantially normal rate to a substantially abnormal rate within a month's time or less. FIG. 2 is a diagrammatic graph illustrating asynchronous pacer rate in pulses per minute against implant time in months.

The lead 1 ECG of the 12 standard leads used in the cardiologist's art has been chosen here as being the most naturally convenient for use with the monitor apparatus 10 since the lead 1 ECG requires electrical connection to be made to the patient's arms and usually a ground or indifferent electrode (see electrode 201 in FIG. 3) is connected to the patient's right leg. Other ECG leads, however, could be used as well if desired, as for example, electrical connections to the left arm and left leg. Previously electrocardiograms have been transmitted over communication links to be used for diagnostic purposes at the receiving end, however, when this was done with heart pacer patients, the pacer artifact information which is normally derived simultaneously with the electrocardiogram was not transmitted with sufficient definition to be useful diagnostically at the receiving end and separate apparatus was used to transmit pacer artifact information. Accordingly, there was no convenient way in which a particular artifact representing a pacer stimulus could be related in time to the QRS portion of the electrocardiogram resulting from this stimulus. The present apparatus provides a means for transmitting and recording a representation of the sensed pacer artifact in proper time relationship to the sensed electrocardiogram such that in a properly functioning pacer the recorded signal complex shows a pacer artifact immediately preceding in time a QRS complex with sufficient clarity to be useful for diagnostic purposes; i.e., a recording of a pacer artifact from a properly functioning pacer will be followed immediately by the QRS portion of the electrocardiogram thereby providing assurance to the clinician that the pacer output pulse is in fact properly stimulating the heart. In line 500 of FIG. 5 there is shown a diagrammatic graph illustrating a sensed pacer artifact signal recorded simultaneously with the patient's electrocardiogram showing the two in proper time relationship indicating that the output pulse of the pacer is properly stimulating the heart. It should be pointed out here that the ECG of FIG. 5 is a typical diagrammatic illustration of that of a pacer patient and thus appears different from a text book representation of an ECG.

Figure 3:
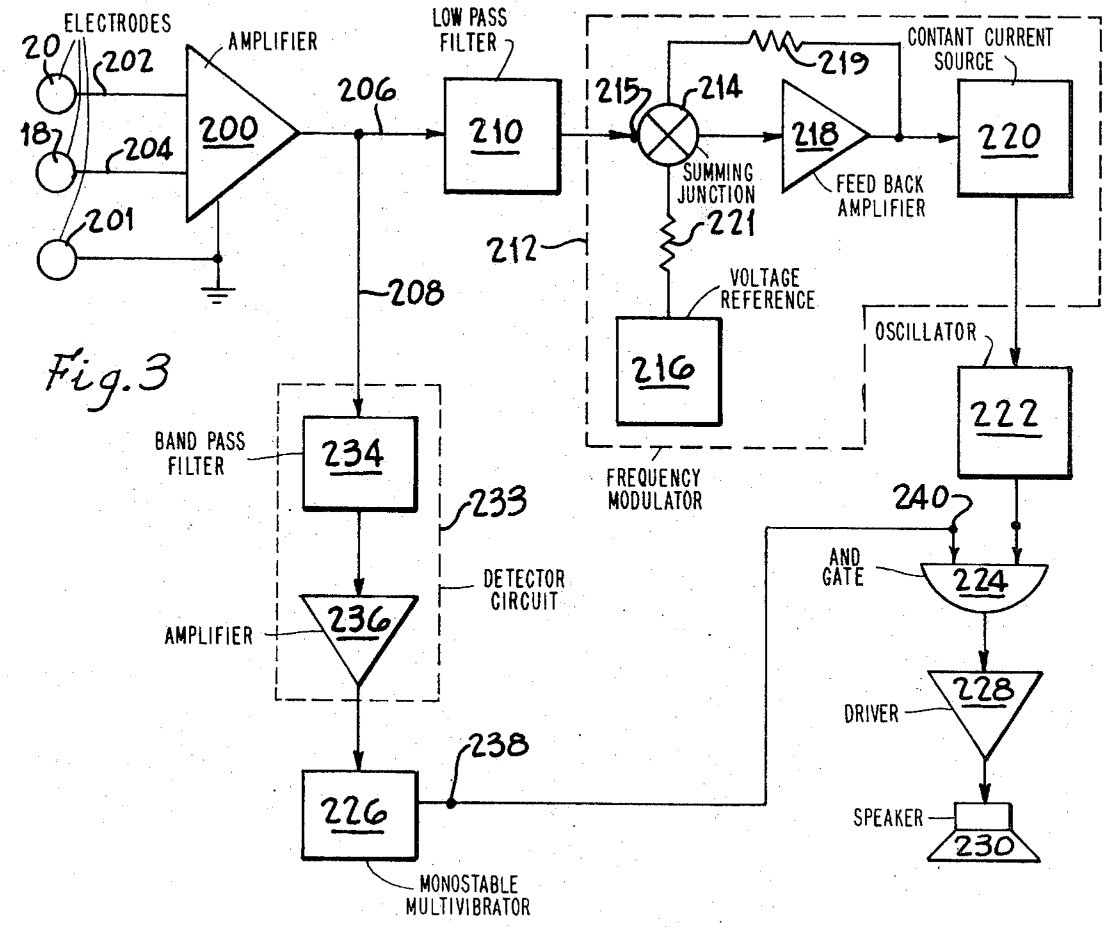
FIG. 3 is a block diagram of the transducer means of the monitor apparatus.

Detailed Description of Interconnection of the Various Components and Operation Having generally outlined the characteristics and use of the monitor apparatus, a more detailed description of the transducer 12 and receiver 16 and their operation will now be given with reference to FIGS. 3, 4, and 5. In FIG. 3 a block diagram of the circuitry of transducer 12 is shown and, in FIG. 4, a block diagram of the circuitry of receiver 16 is shown. FIG. 5 is a timing diagram illustrating the inputs and outputs of the various components of the monitor apparatus 10; those inputs and outputs that are illustrated are labeled at the left hand margin of FIG. 5. FIG. 5 is diagrammatic and not to exact time scale, but does illustrate the sequence of operation of the monitor apparatus 10.

In the following description various logic elements and bistable devices are described. An AND gate is well known in the art and yields a logic one (1) on its output terminal if all of the input terminals thereof have logic ones applied thereto; a logic zero (0) appears on its output terminal if a logic 0 appears on any of its input terminals. The two possible states of a bistable device may be represented on the output terminals thereof as logic ones and zeroes. In both AND gates and in the bistable devices, ground states or near ground states usually represent logical zeroes and voltage levels above ground usually represent logical ones. Implementation of apparatus of the invention can be accomplished by whichever convention is chosen, that is, the logic symbols and function may be reversed.

Figure 4:
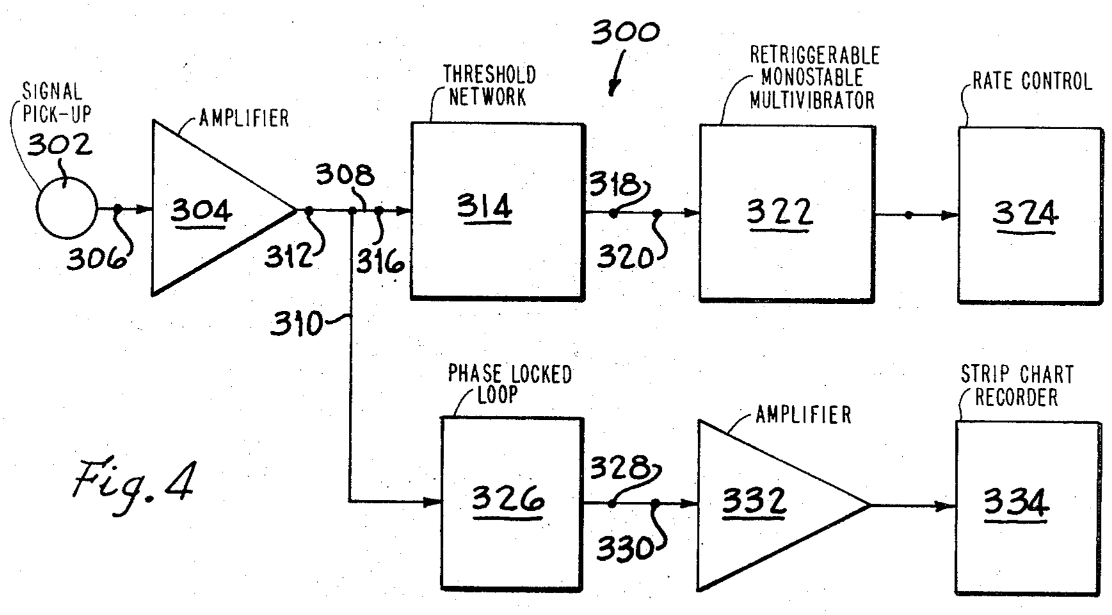
FIG. 4 is a block diagram of the receiver means of the monitor apparatus.
Figure 5:
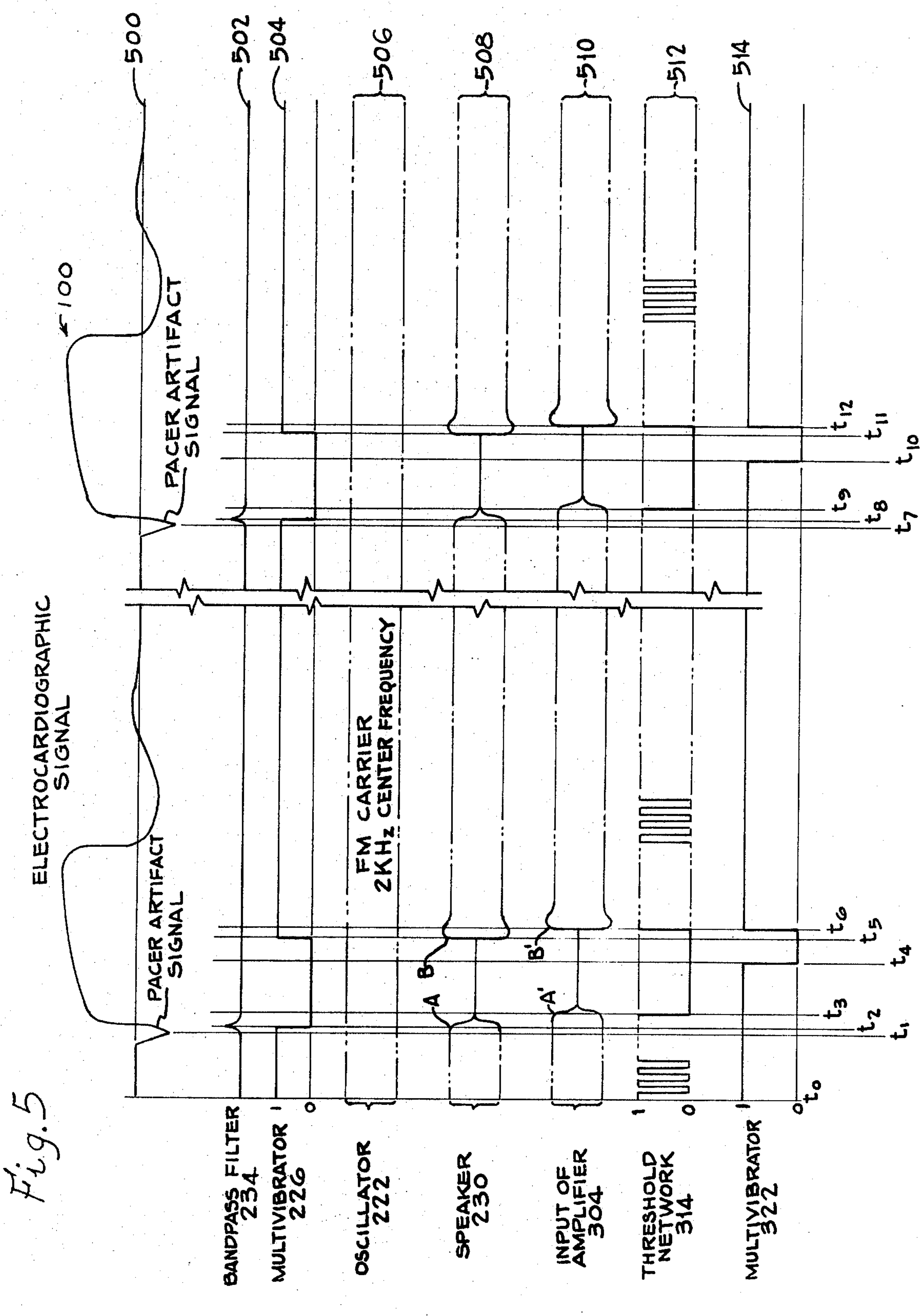
FIG. 5 is a timing diagram useful to explain the operation of the monitor apparatus.

Referring now to FIGS. 3, 4 and 5, signals 100, that is, the patient's electrocardiographic signals and the pacer artifact signals are sensed by the electrode bracelets 18 and 20 worn on the patient's arms and, if utilized, the electrode 201 worn on the patient's right leg or at another location on the patient's body. Electrode 201 may also be in the form of stretch band electrode similar to electrodes 18 and 20. It should be pointed out here, that the monitor apparatus 10 may be utilized with arm bands different from those shown in FIG. 1 and described in the above identified concurrently filed application. For example, the arm bands 18 and 20 may simply comprise metallic stretch bands having their ends joined together to form a circle. In this situation, however, the electrode 201 would be utilized and be connected to the ground terminal of an amplifier, to be described, forming a part of the transducer 12. Signals 100 are shown on line 500 in FIG. 5. Typically, the artifact signals are from between 0.5 millivolts to 50 millivolts in amplitude with a 0.5 millisecond to 2 milliseconds duration and with a rise time on the order of 200 microseconds or less.

The sensed signals 100 are carried to an amplifier such as an Instrumentation Amplifier stage 200 via leads 202 and 204. An Instrumentation Amplifier linearly amplifies the input signals rejecting errors caused by common mode signals of large amplitude that may be present. In a normal amplifier such common mode signals would tend to mask out the desired low level electrocardiographic and pacer artifact signals and even cause amplifier malfunction such as saturation. The amplification stage 200 has a high input impedance, a low output impedance and typically greater than unity gain, for example, a gain of twelve. The high input impedance of stage 200, approximately 10 megohms or greater is required because of the high source impedance which can occur between the electrodes 18 and 20, and the patient's skin. The source impedance of a patient as measured between his arms, using the electrodes 18 and 20, typically can elevate to tens of thousands of ohms depending upon the impedance between the skin surfaces of the patient and the electrodes which is influenced by environmental and physiological variations.

The output of the amplifier 200 feeds two paths or channels via leads 206 and 208. The path via lead 206 may be considered the ECG channel and the path via lead 208 may be considered the pacer artifact channel. VIa lead 206, the sensed signal passes through a Low Pass Filter 210 having an upper 3dB point of 100 Hz. Frequencies above 100 Hz are of little interest in reproducing the electrocardiogram and are thereby attenuated by the Low Pass Filter 210. Most of the frequencies associated with the pacer artifact signal are well above 100 Hz and are thus attenuated sufficiently by the Low Pass Filter 210 and do not pass through the ECG channel. The output of the Low Pass Filter 210 is fed to a Frequency Modulator or FM stage 212. FM stage 212 comprises a Summing Junction 214, a Voltage Reference Source 216, a Feedback Amplifier 218, and a Constant Current Source 220. The action of the Frequency Modulator 212 causes the frequency of an Oscillator 222, connected to the Constant Current Source 220, to vary in accordance with the signal current level at the output of the Low Pass Filter 210. The output of the Summing Junction 214 is a representation of the algebraic sum of the signal current levels appearing at its three inputs. The output current signal of the Summing Junction 214 drives the Feedback Amplifier 218 and causes its output to change in such a manner that the current fed back to the Summing Junction via resistor 219 results in a zero current output of the Summing Junction 214 when the fed back current is algebraically added to the input currents from the Low Pass Filter 210 and the Voltage Reference 216; the current signal from the Voltage Reference 216 is derived via resistor 221. When the output of the Summing Junction 214 becomes zero no further change in current occurs in the Feedback Amplifier 218 output. The output voltage of the amplifier 218 is thus proportional to the algebraic sum of the output currents from the Low Pass Filter 210 and the Voltage Reference 216. The current output of the Constant Current Source 220 is linearly controlled by the output voltage of the Feedback Amplifier 218. In turn the output of the Constant Current Source 220 linearly controls the frequency of the Oscillator 222.

In the absence of a signal input to the Low Pass Filter 210 such as may be derived from the patient via the arm band electrodes 18 and 20, the quiescent output current level of the Low Pass Filter 210 added algebraically to the output current of the Voltage Reference 216 causes the Amplifier 218 to assume an output voltage which in turn causes the Constant Current Source 220 to fix the frequency of the Oscillator 222 at some desired value, in this case, 2 KHz. When an ECG signal is sensed by the pick-up means 18 and 20 there results a change from the quiescent level output of the Low Pass Filter 210. The new output algebraically added to the signal from the Voltage Reference 216 and acting through the Amplifier 218 and Constant Current Source 220 causes the frequency of the Oscillator 222 to be shifted above or below 2 KHz according to the increase or decrease of the Low Pass Filter 210 output about the quiescent level such that the amount of frequency shift is linearly algebraically proportional to the aforementioned increase or decrease in signal level.

In summary, the operation of the FM stage 212 and Oscillator 222 is as follows: the Oscillator 222 provides an electrical carrier signal of 2 KHz and the FM stage 212, being coupled to the electrocardiographic signals of the patient and to the carrier signal of Oscillator 222, frequency modulates the carrier signal of Oscillator 222 with the instantaneous voltage amplitude of the electrocardiograhic signals of the patient to provide a modulated electrical carrier signal.

In both situations, that is, when an ECG signal is being sensed or when an ECG signal is not being sensed, the output of the Oscillator 222 passes through a control means or AND gate 224 which is normally enabled by a high level output signal (i.e., 1 level logic signal) from a Monostable Multivibrator 226, and is amplified by an Output Driver stage 228 which is in turn coupled to an output means or audio permanent magnet speaker 230. The speaker 230 generates an audible signal in correspondence to the carrier signal and when an electrocardiographic signal is being sensed in correspondence to the modulated carrier signal. The audible signal is solely a 2 KHz carrier signal in the absence of a sensed ECG signal at the electrodes 18 and 20, and a frequency modulated audible signal when an ECG signal is being sensed at the electrodes 18 and 20. The envelopes of these signals are shown in lines 506 and 508 of FIG. 5. Line 508 contains the information representative of the patient's ECG. The audible signal of line 508 is coupled to the handset 24 for transmission to the receiver 16 where it is processed, in a manner to be described below, to record the ECG of the patient.

Via lead 208, the output of Amplifier 200 passes to a pacer artifact Detector circuit 233. The Detector circuit 233 comprises a Band Pass Filter 234 and an Amplifier 236. The Band Pass Filter 234 has 3db points at 1,800 Hz and 2,200 Hz. The Band Pass Filter 234 is intended to pass a portion of the spectrum of frequencies associated with the pacer artifact, depending on the artifact signal which normally is between 0.5 and 2.0 milliseconds wide and having a rise time of 200 microseconds. The spectrum of frequencies of an artifact signal typically ranges from 500 Hz to upwards of 10 KHz. Thus some portion of the energy of any normally encountered artifact will pass through the Band Pass Filter 234. The filter 234 will attentuate all unwanted signals with frequency components lying outside the passband thereof, as, for example 60 Hz signals and TV interference signals. Since the component frequencies of the sensed electrocardiographic signals lie well below the passband of the filter 234, they will likewise be sufficiently attentuated and the electrocardiographic signals will not pass through this channel.

The output of the Band Pass Filter 234 is shown in line 502 of FIG. 5 and is applied to the Amplifier 236 which raises the level of the signals passing through the Band Pass Filter 234 to the trigger sensitivity of the next stage comprising a Monostable Multivibrator 226. Thus, the Detector circuit 233 provides an output signal in response to the detection of each pacer artifact signal sensed which output signal is applied to the Multivibrator 226 to trigger its operation. The Multivibrator 226 may be considered a control means for providing a control signal and is arranged to normally provide a high level signal or logic 1 signal on its output terminal 238. The output of Multivibrator 226 is shown on line 504 of FIG. 5. This logic 1 signal when applied to the input terminal 240 of AND gate 224 normally enables AND gate 224 and permits signals from the Oscillator 222 to pass through the AND gate 224. However, when the Multivibrator 226 is triggered, it enters its astable state for a period of time beginning with the pacer artifact signal, as for example, about 10 milliseconds, before returning to its stable state. In its astable state, a low level or logic 0 signal appears on its output terminal 238. This logic 0 signal, when applied to the input terminal 240 of AND gate 224, disables AND gate 224 effectively cutting off the Oscillator 222 output to the speaker 230. Stated another way, the cutting of the Oscillator 222 output, as described, is in effect a 100 percent amplitude modulation of the carrier signal or the modulated carrier signal. Thus, the control means or AND gate 224 normally permits coupling to the speaker 230 of the carrier signal or modulated carrier signal, and it effectively modulates the amplitude of the carrier or modulated carrier signal in response to a control signal from the Multivibrator 226. The envelope of the output of the speaker 230 is shown on line 508 of FIG. 5. The beginning of turn-off of the carrier signal of line 506, that is, the output of the speaker 230 is shown at point A in line 508. The turn-off coincides, in time, with triggering of the Multivibrator 226. The turn-on of the carrier signal of line 506, that is, the output of the speaker 230 is shown at point B in line 508. The turn-on of the carrier coincides, in time, with the termination of the astable state of the Multivibrator 226. It will be noted that the turn-off of the carrier signal occurs a short period of time after the pacer artifact signal of line 500 is sensed by the electrodes 18 and 20. This short delay is a system delay that is fixed and occurs mainly in the Bandpass Filter 234. In a manner to be described below, this interruption or amplitude modulation of the output of the Oscillator 222 and thus the output of speaker 230 is processed by the receiver 16 to provide pacer rate information.

Referring now to FIG. 4, the receiver 16 in accordance with the invention is shown generally at 300 in FIG. 4. A Signal Pick-up means is shown at 302. The Signal Pick-up 302 is operatively connected to an Amplifier 304. The Signal Pick-up 302 is adapted to be placed adjacent to the telephone earpiece contained in the handset of a standard telephone. Preferably, the Signal Pick-up 302 comprises a magnetic type such that the variations in current which drive the telephone earpiece are magnetically coupled to the Amplifier 304. If desired, the Amplifier 304 may be acoustically coupled to the telephone earpiece via a microphone.

The envelope of the signals appearing on the input terminal 306 of the Amplifier 304 are shown diagrammatically at line 510 of FIG. 5. The beginning of turn-off of the carrier signal is shown at Point A′ in line 510. The short interval of time between points A and A′ is a result of a delay in the communication link 14. The turn-on of the carrier in line 510 occurs at point B′.

The Amplifier 304 has sufficient gain to accommodate most attenuation losses that can be expected on the standard switched telephone network.

The output of Amplifier 304 feeds two paths or channels via leads 308 and 310. The channel via lead 308 may be considered the Pacer Rate Channel and the channel via lead 310 may be considered the ECG Record and Pacer Artifact Record Channel.

Via lead 308, signals appearing on the output terminal 312 of Amplifier 304 are fed to a Threshold Network 314. The signals appearing on the input terminal 316 of Threshold Network 314 are substantially identical to those appearing on the input terminal 306 of Amplifier 304, the level of the signals is, of course, higher. The Amplifier 304 has sufficient gain to trip the Threshold Network 314.

The Threshold Network 314 is essentially a device to convert the signals appearing on its input terminal 316 into a standardized pulse train of signals; see line 512 of FIG. 5. The Threshold Network 314 may, for example, comprise a Schmitt trigger circuit or any other suitable Threshold device.

Signals emanating from Threshold Network 314 appear at point 318 and are fed to the input 320 of Retriggerable Monostable Multivibrator 322.

The first positive signal transition emanating from the Threshold Network 314 triggers the Multivibrator 322 into its astable state which is longer in duration than the period between any two successive positive signal transitions emanating from the Threshold Network. Recall that this signal is a frequency modulated one so that the period between any two successive transitions can vary about a nominally chosen period, in this case 0.5 milliseconds corresponding to a signal frequency or repetition rate of 2 KHz. Each successive positive transition from the Threshold Network 314 will retrigger the Multivibrator 322 which has a characteristic such that the duration of its astable state is recycled or reset to the initial or full value at each triggering resulting in a high signal level or logic 1 at its output 323. Thus as long as triggering signals of shorter period than its astable period appear at its input, the Multivibrator 322 output will remain high. When the carrier or modulated carrier is cut off or amplitude modulated, as for example, at a time corresponding to point A′, there will be a cessation of signals, in particular positive transitions from the Threshold Network, and the Multivibrator 322 will cycle through its astable state resulting in a low or logic 0 level at the Multivibrator 322 output at the termination of the astable state. The duration of the astable state has been chosen in this case to be 6 milliseconds so that 6 milliseconds after the last positive transition emanating from the Threshold Network 314 after cessation of the carrier, the Multivibrator 322 will assume the logic 0 state. Recall that the Multivibrator 226 in the transducer 12 effects the cessation of the carrier for 10 milliseconds. The Multivibrator 322, therefore, is in its stable state for 4 milliseconds after which the carrier transmission is resumed, at a time corresponding to point B′ and the Multivibrator 322 is triggered to its astable state with a high level output at the first positive transition from the Threshold Network 314.

The output of Multivibrator 322 is connected to an interval or to a rate counter 324. It may be pointed out here that a rate counter typically includes circuitry for measuring time interval, and operatively connected to this circuitry is conversion circuitry for converting the time interval measurements of the circuitry for measuring time to rate information. Accordingly, one may measure time interval between particular events or the rate of occurrence of such events by simply choosing electronically which type information is desired. Consequently, block 324 may be considered an interval or a rate counter for displaying whatever type information is desired, namely, time interval measurements, rate measurements or even both. Rate or time interval in the monitor apparatus 10 is measured between two successive positive signal transitions of the Multivibrator 322 output as at time $t_6$ and time $t_{12}$ (see FIG. 5). With the first positive transition, the counter 324 begins measuring rate or time interval. The appearance of the second positive transition stops the measurement and the resulting rate or time interval is immediately displayed.

An example will now be given of the sequence of events in the time interval measurement process of the receiver 300.

At time $t_0$, and assuming the monitor apparatus has just been turned on, the carrier will have been established as described above. At time $t_1$, a pacer artifact is sensed at the electrodes 18 and 20. After a fixed system delay, the Bandpass Filter 234, and Amplifier 236 produces an output (line 502) at $t_2$) which triggers Multivibrator 226 (line 504 at $t_2$). Also, at $t_2$, the output of the AND gate and hence the carrier is cut off (Point A, line 508). After a delay in communications link 14, the time of carrier cut-off appears at the output of Amplifier 304 ($t_3$, point A', line 510). This delay in the communication link 14 varies with the type of link and the particular set of connections made. At worst, for a particular set of connections, the delay varies so slowly as to be ineffectual in degrading the desired accuracy of the time interval measurement. Also at $t_3$, the sequence of transitions emanating from the Threshold Network 314 ceases, line 512, and the Multivibrator 322 begins to time out. After 6 milliseconds, it times out at $t_4$, line 514. Next the Multivibrator 226 times out 10 milliseconds from $t_2$, as at $t_5$, line 504. Also at time $t_5$, the carrier and speaker output are re-established, line 508. After the same communication link delay, the re-established carrier appears at the output of Amplifier 304, at time $t_6$, line 510. Also at time $t_6$, the output of the Threshold Network 314 appears, line 512, to trigger the Multivibrator 322, whose output now returns to a logic 1, line 514. This positive transition at the output of the Multivibrator 322 causes the interval or rate counter 324 to begin measuring rate or time interval. The appearance of the next pacer artifact initiates the same sequence of events that occurred between $t_1$ and $t_6$ beginning at time $t_7$ and ending with the positive transition of the output of Multivibrator 322 at time $t_{12}$ except that now this transition causes the interval or rate counter 324 to stop measuring rate or time interval and to display the results as at 17 in FIG. 1. The interval or rate counter 324 remains inactive until the appearance or sensing of the next pacer artifact signal which results in causing the counter to begin another measurement. Thus the counter performs a rate or a time interval measurement between successive pairs of sensed pacer artifacts. Rate or time interval is actually measured between two events, the positive transitions of Multivibrator 322 as at $t_6$ and $t_{12}$, line 514, which are delayed from the actual occurrence of the artifacts at times $t_1$ and $t_7$. However, since the rate or the time interval between $t_1$ and $t_6$ and the rate or time interval between $t_7$ and $t_{12}$ are equal, valid rate or time interval measurements between the pacer artifacts are obtained. This is possible because the system and communication link delays between $t_1$ and $t_6$ are fixed as are those between $t_7$ and $t_{12}$.

The output of Amplifier 304 also traverses path 310 to the input of a Monolithic Phase Locked Loop 326.

The phase locked loop 326 demodulates the incoming carrier signal, shown on line 510, to recover the original low frequency electrocardiographic information transmitted over the communication link 14 and thus provide a demodulated signal. The basic principles and mode of operation of a Monolithic Phase Locked Loop 326 are fully set forth in the article entitled *The Monolithic Phase-Locked Loop-A Versatile Building Block*, by Alan B. Grebene, published in IEEE Spectrum, Mar., 1971, pages 38–49. For the present discussion, however, it is only necessary to understand that when the carrier at the transducer 12 is interrupted in response to a sensed pacer artifact as described previously, the output voltage of the phase locked loop 326 moves toward a reference voltage, as for example, zero volts. When the carrier is turned on again, as described previously, the output voltage of the phase locked loop moves to a value corresponding to the instantaneous value of the electrocardiographic modulating signal. The result of the carrier interruption, i.e., turn-off, and its turn-on is a clearly recognizable transient in the voltage output of the phase locked loop 326 that is representative of the time of occurrence of the pacer artifact with reference to the patient's electrocardiogram. This transient voltage can be seen in FIG. 5, line 500 labled-pacer artifact-.

The varying output voltage of the phase locked loop 326 appears at its output terminal 328. Parenthetically, the voltage waveform of line 500 of FIG. 5 also diagrammatically illustrates the varying output voltage of Phase locked loop 326 and is the demodulated signal referred to above. From terminal 328 the output voltage of Phase locked loop 326 passes to the input terminal 330 of an Amplifier 332 where it is amplified to be made compatible with the input requirements of any standard ECG strip chart recorder, designated in FIG. 4 by the reference character 334 and in FIG. 1 as 17*a*.

Figure 6:
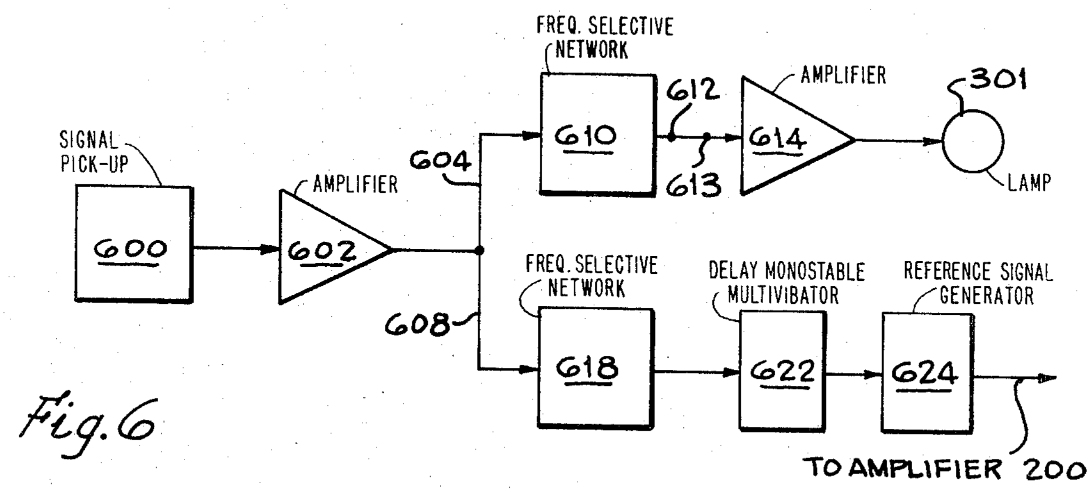
FIG. 6 is a block diagram of circuitry forming a part of the transducer means of the monitor apparatus.
Figure 7:
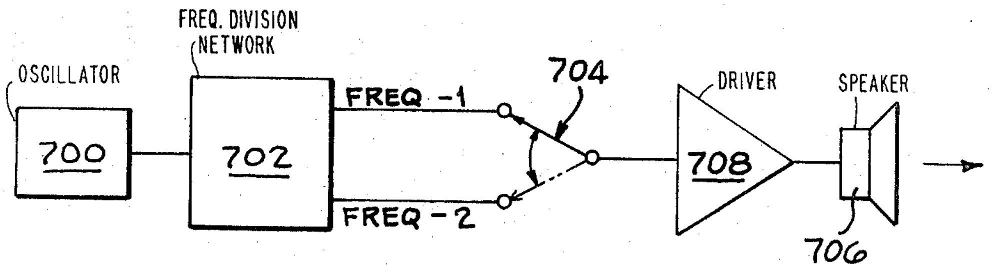
FIG. 7 is a block diagram of circuitry forming a part of the receiver means of the monitor apparatus.

Another feature of the receiver 300 is illustrated in FIG. 7 which feature works in conjunction with components built into the transducer 12 which are illustrated in FIG. 6.

Referring now to FIG. 7 there is shown apparatus for the purpose of initiating a patient alert signal or alternatively a calibrate signal.

As the patient's telephone handset rests in the transducer 12 while monitoring is being effected, it is difficult for the operator of the receiver 300 to establish voice contact with the patient. The patient alert feature permits the operator of the receiver 300 to signal the patient to pick-up the handset and re-establish voice communication. A patient alert signal after transmission through the communication link or telephone network and reception by the transducer 12 activates apparatus in the transducer which in turn causes, for example, a lamp 301 (FIG. 1) on the transducer 12 to light. By prearrangement this indicates to the patient to pick-up the handset.

Considering the patient alert feature in greater detail and referring specifically to FIGS. 6 and 7, there is a reference Oscillator 700 which establishes a predetermined frequency, as for example 100 KHz. The output of Oscillator 700 is fed to a frequency division network 702 which establishes two signals of lower frequency. One frequency is used in the patient alert feature and the other in the calibrate feature as will be described more fully hereinafter. The frequency designated Freq. 1 in FIG. 7 is selected by means of switch 704 and is fed to a speaker 706 via a driver Amplifier 708. The resulting audible signal output of the speaker 704 is coupled to the operator's handset resting on the receiver 300 and is transmitted via the communication link 14 to the handset resting on the patient's transducer unit.

A signal pick-up 600 (FIG. 6) is adapted to be placed adjacent to the telephone earpiece contained in the patient's handset. The signal pick-up 600 is housed within the transducer housing and may be acoustically or magnetically coupled to the handset. With a magnetic pick-up, the magnet variations in the handset's earpiece are sensed by the magnetic pickup 600. The signals are amplified by Amplifier 602. The output of Amplifier 602 feeds two paths via leads 604 and 608. Via lead 604, the amplified signals are coupled to a sharply tuned Frequency Selective Network 610 which is responsive only to the Freq.-1 sent from the receiver 300. The Frequency Selective Network 610 performs two functions, namely, it recognizes the Freq.-1 signal and in response to the recognition establishes a DC voltage level at its output terminal 612.

This DC voltage level is applied to the input terminal 613 of Amplifier 614 whose output is connected to the lamp 301. Lamp 301 remains lit for the duration of the transmission of the Freq.-1 signal, that is, as long as the switch 704 is maintained in position to interconnect the Freq.-1 signal to the driver 708 and Speaker 706.

Calibration of the monitor apparatus, and specifically the electrocardiogram feature of the monitor apparatus is necessary to obtain optimum diagnostic interpretation of the recorded electrocardiogram.

The operation of the calibrate feature of the receiver 300 is as follows: The frequency designated Freq.-2 in FIG. 7 is selected by means of switch 704 and is fed to speaker 706 via driver Amplifier 708. The resulting audible signal output of the speaker 704 is coupled to the operator's handset and is transmitted via the communication link 14 to the handset resting in the patient's transducer unit. From the handset on the transducer, the magnetic variations in the handset's earpiece are sensed by the magnetic pick-up 600 (FIG. 6). The signal is amplified by Amplifier 602. The output of the Amplifier 602 in this instance is coupled via path 608 to another sharply tuned Frequency Selective Network 618 which is responsive to only the Freq.-2 signal transmitted from the receiver 300. Operation of Frequency Selective 618 is the same as Frequency Selective Network 610.

The DC voltage level output of Frequency Selective Network 618 is applied to a Delay Monostable Multivibrator 622, however, at this time there is no change in the output state of the Multivibrator 622 because it is of a type that triggers on a negative voltage transition on its input terminal. When the Freq.-2 signal is no longer present, that is, not being transmitted, as when the receiver operator releases the switch 704, the DC voltage level of Frequency Selective Network 618 reverts to a lower level which change in voltage level causes the triggering of the Multivibrator 622. When multivibrator 622 is triggered a high level (logic 1) signal appears on its output terminal which is then coupled to a Reference Signal Generator 624 which in turn is coupled to Amplifier 200 of the transducer 12. When the Multivibrator 622 recovers from its astable state the output voltage of the Multivibrator 622 reverts to its original low level (logic 0). The negative transition appearing at the input of Reference Signal Generator 624 causes a transient reference voltage of predetermined level, for example 1 mv, to be coupled to the Amplifier 200. This transient signal is processed by the transducer 12 in the same manner as an electrocardiographic signal via path 206 of the transducer 12. That is, the first channel means or path 206 frequency modulates the carrier of Oscillator 222 with the voltage amplitude of the reference voltage to provide a second modulated carrier signal which is coupled to the speaker 230 to produce an audible second modulated carrier signal. When the transient signal or audible second modulated carrier signal is received at receiver 300, it follows the path 310 in the receiver where it is demodulated to provide a demodulated signal. The end result is the appearance of a transient signal corresponding to the reference voltage on the strip chart recorder whose amplitude representa a 1 mv change in signal level at the input of Amplifier 200. When this transient signal of known amplitude is used as a reference the amount of voltage change in the electrocardiogram of the patient can be determined.

From the foregoing, it will be understood that the described monitor apparatus can be utilized to not only provide a display of the time interval between electrical artifact signals produced as the result of a heart pacer artificially stimulating the heart of the patient, but also, to present a representation in the recorded electrocardiogram of the artifact signals and their temporal relationship to the QRS complex of the electrocardiographic signals of the patient.

It will be obvious to those skilled in the art that the monitor apparatus while designed and described for the "remote" monitoring of either natural or artificial stimulation signals, can be used for these purposes in a single room or location, as for example, a clinic building. In such an instance, the communication link may comprise any means capable of transmitting the information as sensed and processed by the transducer 12 to the receiver 16. It will be further understood, that the output or transmitted signals of the transducer 12 need not be audible signals, but may comprise electrical output signals with appropriate modification of the monitor apparatus both at the transducer output end and at the input end of the receiver. Accordingly, the use of the term "transducer" is not to be construed as limiting the monitor apparatus and specifically that portion of the monitor apparatus designated as the transducer 12, to a device which converts the sensed electrical stimulation signals to audible transmittable signals. Both the input to and the output from the transducer 12 may be electrical signals, and the input to the receiver 16 may be either audible or electrical signals.

It should also be understood that each of the components shown in block form in the various figures of the drawing can be readily implemented with commercially available components or can be readily implemented utilizing standard text book knowledge since the function of each block of the drawings has been fully set forth.

Having thus described our invention, we claim:

1. A transducer for monitoring electrical artifact signals of a living body resulting from artificial stimulation of a body part comprising:

a. sensing means connectable to the body for sensing electrical artifact signals in the body;

b. generating means for generating an electrical carrier signal;

c. output means operatively connected to the generating means and including means for producing an output signal in correspondence to the electrical carrier signal when the electrical carrier signal is coupled to the output means;

d. control means operatively connected between the generating means and the output means for normally permitting coupling to the output means of the electrical carrier signal and for modulating the the amplitude of the electrical carrier signal 100 percent in response to a control signal thereby cutting off the electrical carrier signal from the output means; and e. channel means operatively connected to the sensing means and to the control means and including control signal producing means responsive to each sensed electrical artifact signal for providing a control signal for effecting operation of the control means to modulate the amplitude of the electrical carrier signal 100 percent.

2. A transducer for monitoring electrical signals of a living body resulting from both natural and artificial stimulation of a body part comprising:

a. sensing means connectable to the body for sensing electrical stimulation signals in the body;

b. first channel means operatively connected to the sensing means and including generating means for generating an electrical carrier signal, and modulation means for frequency modulating the electrical carrier signal in response to sensed natural stimulation signals to provide a frequency modulated carrier signal;

c. output means operatively connected to the first channel means for producing an output signal in correspondence to the frequency modulated carrier signal when the frequency modulated carrier signal is coupled to the output means;

d. control means operatively connected between the first channel means and the output means for normally permitting coupling to the output means of the frequency modulated carrier signal and for modulating the amplitude of the frequency modulated carrier signal 100 percent in response to a control signal thereby cutting off the electrical carrier signal from the output means; and e. second channel means operatively connected to the sensing means and the control means and including control signal producing means responsive to each sensed artificial stimulation signal for providing a control signal for effecting operation of the control means to modulate the amplitude of the frequency modulated carrier signal 100 percent.

3. A transducer for monitoring electrical signals of a patient resulting from both naturally occurring electrocardiographic signals and artificial electrical stimulation signals stimulating the heart of the patient comprising:

a. sensing means connectable to the body for sensing naturally occurring electrocardiographic signals and for sensing artificial electrical stimulation signals in the body;

b. first channel means operatively connected to the sensing means, the first channel means comprising:

i. first means for providing an electrical carrier signal; and ii. second means operatively connected to the first means and to the sensing means for frequency modulating the electrical carrier signal in response to the sensed naturally occurring electrocardiographic signals to thereby provide a frequency modulated carrier signal;

c. output means operatively connected to the first means for producing an output signal in correspondence to the frequency modulated carrier signal when the frequency modulated carrier signal is coupled to the output means;

d. control means operatively connected between the first means and the output means for normally permitting coupling to the output means of the frequency modulated carrier signal and for modulating the amplitude of the modulated carrier signal 100 percent in response to a control signal thereby cutting off the electrical carrier signal from the output means;

e. second channel means operatively connected to the sensing means and the control means, the second channel means comprising:

i. detector means operatively connected to the sensing means for detecting the occurrence of each artificial stimulation signal and for providing an output signal in response to the detection of an artificial stimulation signal; and ii. control signal producing means operatively connected to the detector means and to the control means for providing a control signal to the control means in response to an output signal from the detector means which control signal effects operation of the control means to modulate the amplitude of the frequency modulated carrier signal 100 percent.

4. A transducer for monitoring both electrocardiographic signals of a patient and electrical artifact signals of a patient produced as the result of the electrical output of a heart pacer artificial stimulating the heart of the patient, comprising:

a. sensing means connectable to a patient to provide electrocardiographic signals in response to the patient's heart function and to provide electrical artifact signals in response to the electrical output of a heart pacer artificially stimulating the patient's heart;

b. first channel means operatively connected to the sensing means, the first channel means comprising:

i. first means to provide an electrical carrier signal, and ii. second means operatively connected to the first means and to the sensing means to frequency modulate the electrical carrier signal in response to sensed electrocardiographic signals to provide a frequency modulated electrical carrier signal, c. output means operatively connected to first means for providing an audible output signal in correspondence to the frequency modulated electrical carrier signal when the frequency modulated electrical carrier signal is coupled to the output means;

d. control means operatively connected between the first channel means and the output means and being operative to normally couple the frequency modulated electrical carrier signal to the output means and for modulating the amplitude of the frequency modulated electrical carrier signal 100 percent in response to a control signal thereby cutting off the electrical carrier signal from the output means; and e. second channel means operatively connected to the sensing means and to the control means, the second channel means comprising:

i. first means operatively connected to the sensing means for providing an electrical output signal in response to each electrical artifact signal, and ii. control signal producing means operatively connected to the first means of the second channel means and to the control means to provide a control signal to the control means in response to each electrical output signal of the first means of the second channel means which control signal when applied to the control means effects operation of the control means to modulate the amplitude of the frequency modulated electrical carrier signal 100 percent.

5. A transducer for simultaneously monitoring both electrocardiographic signals of a patient and electrical artifact signals of a patient produced as the result of the electrical output of a heart pacer artificial stimulating the heart of the patient, comprising:

a. sensing means connectable to a patient to provide electrocardiographic signals in response to the patient's heart function and to provide electrical artifact signals in response to the electrical output of a heart pacer artificially stimulating the patient's heart;

b. first channel means operatively connected to the sensing means, the first channel means comprising:

i. first means to provide an electrical carrier signal of predetermined frequency; and ii. second means operatively connected to the first means and to the sensing means to frequency modulate the electrical carrier signal with the voltage amplitude of the electrocardiographic signals to provide a frequency modulated electrical carrier signal;

c. output means operatively connected to the first means for providing an audible output signal in correspondence to the frequency modulated electrical carrier signal when the frequency modulated electrical carrier signal is coupled to the output means;

d. control means operatively connected between the first channel means and the output means and being operative to normally couple the frequency modulated electrical carrier signal to the output means and for modulating the amplitude of the frequency modulated electrical carrier signal 100 percent in response to a control signal thereby cutting off the electrical carrier signal from the output means; and e. second channel means operatively connected to the sensing means and to the control means, the second channel means comprising:

i. detector means operatively connected to the sensing means for providing an electrical output signal in response to the detection of each electrical artifact signal, and ii. control signal producing means operatively connected to the detector means and to the control means, and being coupled to the electrical output signals of the detector means to provide a control signal for a predetermined time interval to the control means in response to each electrical output signal of the detector means which control signal when applied to the control means effects operation of the control means to modulate the amplitude of the frequency modulated electrical carrier 100 percent for the duration of the control signal.

6. A transducer as defined in claim 5 wherein the first channel means further comprises means for attenuating electrical artifact signals thereby effectively preventing electrical artifact signals from passing through the first channel means.

7. A transducer as defined in claim 5 wherein the detector means includes means for attenuating electrocardiographic signals thereby effectively preventing electrocardiographic signals from passing through the second channel means.

8. A receiver apparatus for receiving a carrier signal which at times is amplitude modulated to provide information indicative of the occurrence of an artificial stimulation signal in a living body, the receiver apparatus comprising:

channel means including measuring means for measuring the time interval between successive pairs of amplitude modulations of the carrier signal, the measured time interval between each successive pair of amplitude modulations of the carrier signal being indicative of the time interval between each successive pair of artificial stimulation signals, the channel means further including:

i. first means for providing a continuous pulsating signal at a preselected frequency in response to a carrier signal being received by the receiver and ceasing the pulsations upon the occurrence of an amplitude modulation of the carrier signal being received by the receiver;

ii. second means operatively connected to the first means for providing an output signal a predetermined time interval after the cessation of pulsations from the first means; the measuring means measuring the time interval between successive pairs of output signals of the second means.

9. A receiver apparatus as defined in claim 8 including conversion means operatively connected to the measuring means for converting the time interval measurements of the measuring means to the rate of the occurrence of the artificial stimulation signals.

10. A receiver apparatus for receiving a transmitted carrier signal which at times is 100 percent amplitude modulated to provide information indicative of the occurrence of an artificial stimulation signal in a living body and which carrier signal is also frequency modulated to contain information indicative of naturally oca. pick-up means connectable to a patient to provide electrocardiographic signals in response to the patient's heart function and to provide electrical artifact signals in response to the electrical output of a heart pacer artificially stimulating the patient's heart;

b. first channel means operatively connected to the pick-up means and including means for generating an electrical carrier signal, and means for frequency modulating the electrical carrier signal with the voltage amplitude of the electrocardiographic signals to provide a frequency modulated electrical carrier signal;

c. output means operatively connected to the first channel means to produce an audible output signal for transmission over the telephone communication link in correspondence to the frequency modulated electrical carrier signal when the frequency modulated electrical carrier signal is coupled to the output means;

d. control means operatively connected between the first channel means and the output means and being operative for normally coupling the frequency modulated electrical carrier signal to the output means and thus permitting passage to the output means of the frequency modulated electrical carrier signal and for preventing such passage in response to a control signal;

e. second channel means operatively connected to the pick-up means and the control means and including first means responsive to each sensed electrical artifact signal for providing an electrical output signal in response to each electrical artifact signal, and control signal producing means operatively connected to the first means and to the control means to provide a control signal to the control means in response to each electrical output signal of the first means which control signal effects the operation of the control means and thereby prevents the audible output signal from being transmitted over the telephone communication link thereby providing a 100 percent interruption in the transmission of the audible output signal over the communication link upon the occurrence of each control signal; and B. receiver apparatus for receiving audible output signals transmitted over the telephone communication link, the receiver apparatus comprising:

a. first channel means including means responsive to 100 percent interruptions of the transmitted audible output signal, and means for measuring the time interval between successive pairs of 100 percent interruptions of the transmitted audible output signal; and b. second channel means including means for demodulating the transmitted audible output signal to provide a demodulated signal corresponding to the electrocardiographic signal of the patient, and means for recording the demodulated signal.

15. A monitor apparatus as defined in claim 14 wherein the receiver means further includes:

a patient alert signal generating means for providing an audible signal of a predetermined first frequency which when coupled via the communication link to the transducer means alerts the patient to a preselected set of operating instructions; and wherein the transducer means further includes:

means responsive to the transmitted audible signal of predetermined first frequency for providing an alerting signal to the patient.

16. A monitor apparatus as defined in claim 14 wherein the receiver means further includes:

calibration means for generating an audible signal of a predetermined second frequency which when coupled via the telephone communication link to the transducer means causes the transducer means to generate a reference voltage; and wherein the transducer means further includes:

means for generating a reference voltage which when coupled to the first channel means of the transducer means effects operation of the first channel means to frequency modulate the electrical carrier with the amplitude of the reference voltage to provide a second modulated carrier signal which second modulated carrier signal is coupled to the output means to produce a second audible output signal which second audible signal is transmitted via the communication link to the receiver means and is coupled to the receiver apparatus, and wherein the second channel means of the receiver apparatus demodulates the transmitted second audible output signal to provide a demodulated signal comprising a voltage corresponding to the reference voltage thereby providing an indication of the absolute voltage amplitude of the elctrocardiographic signal recorded.

* * * * *